No. 678,317. Patented July 9, 1901.
W. G. KENDALL.
CUSHION TIRE.
(Application filed Nov. 6, 1900.)
(No Model.)
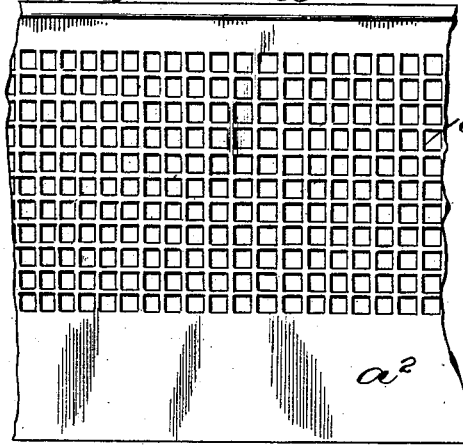
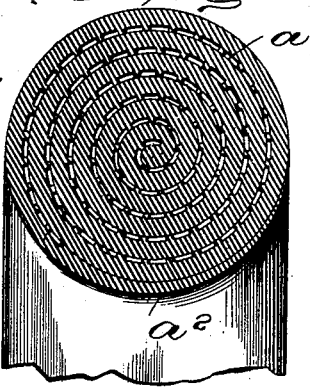
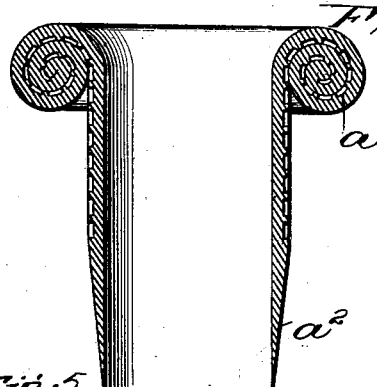
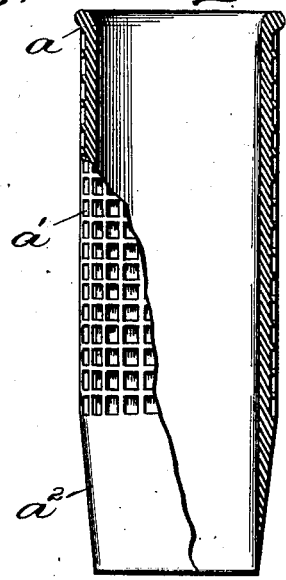
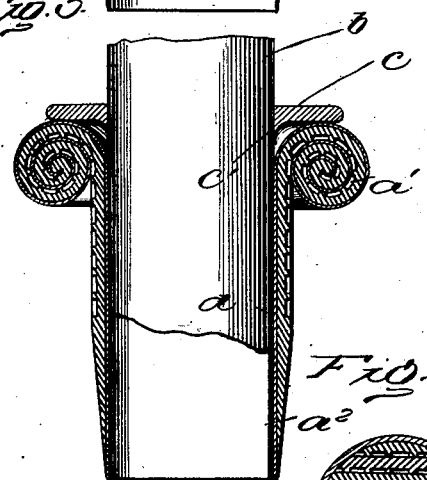
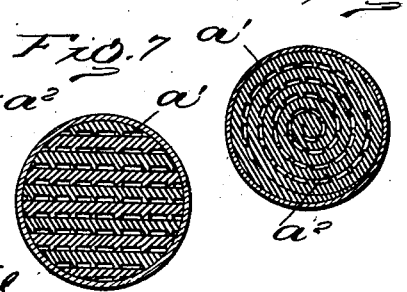
Witnesses
Inventor
W. G. Kendall
By J. R. Nottingham, Attorney

United States Patent Office.

WEBBER G. KENDALL, OF PROVIDENCE, RHODE ISLAND.

CUSHION-TIRE.

SPECIFICATION forming part of Letters Patent No. 678,317, dated July 9, 1901.

Application filed November 6, 1900. Serial No. 35,627. (No model.)

*To all whom it may concern:*

Be it known that I, WEBBER G. KENDALL, a citizen of the United States, residing at Providence, in the county of Providence and State of Rhode Island, have invented certain new and useful Improvements in Cushion-Tires; and I do hereby declare the following to be a full, clear, and exact description of the invention, such as will enable others skilled in the art to which it appertains to make and use the same.

My invention relates to cushion-tires and the method of making the same; and it consists, first, in constructing the tire of two or more layers of tire-forming fabric, each layer spaced from the next adjacent layer, forming air-chambers; second, of the novel means by which the layers are spaced apart to form the air-chambers, and, third, of the peculiar method of forming the tire.

The prime object of the invention is to produce a tire of the character described having the required degree of elasticity and possessing the qualities of stability and durability.

Other objects will become apparent upon further description of the invention.

In the accompanying drawings, Figure 1 is a plan view of the preferred form of the sheet of blank from which my improved tire is constructed, showing one form of prepared surface; Fig. 2, a view of the tube or cylinder formed from the sheet or blank, partly in section; Fig. 3, a vertical sectional view showing the method of rolling or forming the tube or cylinder into the tire; Fig. 4, a cross-sectional view of one form of tire complete; Fig. 5, a view similar to Fig. 3, showing a modification of my invention; Fig. 6, a cross-sectional view showing the core incased in a separate cover, and Fig. 7 a cross-sectional view of another form of tire complete.

Referring to the several views, the letter $a$ indicates a sheet of tire-forming fabric, preferably rubber, of a width sufficient to form a tube or cylinder of the required diameter. The sheet or blank has one of its surfaces provided or formed with raised supports $a'$, preferably united or intersected to form cellular structures, as shown in Figs. 1 and 2. The raised supports may cover the entire surface of the sheet or blank, as shown in Fig. 6, or they may only partially cover the sheet or blank, as shown in Fig. 1, having a strip $a^2$ of plain smooth surface.

In one form of my invention (shown in Fig. 3) the sheet or blank is formed into a tube or cylinder, as shown in Fig. 2, by cementing their side edges together with the smooth or plain surface on the inside. The tube or cylinder is then placed on a suitable tubular mandrel $b$, and a follower $c$, preferably a flat ring having a slightly-curved flange $c'$, is employed to curl or roll the tube or cylinder into the form of an endless ring. Before beginning the operation of curling or rolling the tube or cylinder, if rubber, I prefer to partially cook or vulcanize it or coat the edges or ends of the raised supports with a cement, so that in the process of curling or rolling the said ends or edges will be caused to adhere to the smooth or plain surface of the tube or cylinder. The diameter of the tubular mandrel should be slightly greater than that of the tube or cylinder, so that the latter when placed on the mandrel will be expanded sufficient to cause it to curl or roll readily. In using the follower the flange is inserted between the outer surface of the mandrel and the inner or smooth surface of the tube or cylinder, so that when force is applied the end of the tube or cylinder will curl or roll over upon itself, and as the pressure is continued upon the follower the curling or rolling process will go on until the formation of the tire or core is complete. When the curling or rolling process is finished, the vulcanizing of the tire or core, as the case may be, is completed. If the tire is to be constructed from a sheet or blank similar to that shown in Fig. 1, the strip $a^2$ forms the outer covering of the core; but if the tire to be produced is made from a sheet or blank having one of its surfaces entirely provided with the raised supports it is to be provided with a suitable covering, as shown in Fig. 6, and the vulcanizing completed to cause the edges of the raised supports to adhere to the inner surface of the covering or cement applied to said edges to secure the same effect.

In the form shown in Fig. 7 the tire is formed of a series of sheets or blanks of a length sufficient to encircle the wheel to be provided with the tire, and the width of the layers is so regulated that when placed one upon the other the pile will be substantially circular in cross-section, as shown.

In Fig. 5 I have shown the tube or cylinder formed from the sheet or blank provided with a canvas lining $d$, which is cemented thereto, for the purpose of giving to the tire additional strength and stability when the same is to be applied to the heavy type of vehicle-wheels.

My improved tire is especially applicable to wheels having grooved or channeled rims, and any suitable and efficient means may be employed to secure it onto the wheel.

Each layer or convolution of the tire or core is separately supported by the raised supports, and said supports, together with the confined air, give to the tire a cushioning effect, which will render a vehicle provided with such tires easy and even riding, while the stability afforded by the raised supports will render the tire adaptable to vehicles of light and heavy draft.

While I have shown a form of device for curling or rolling the tube or cylinder, it will be understood that any suitable form may be employed and that where it is desired to produce a core of given length and incase the same in a suitable cover the curling or rolling may be accomplished without forming the sheet or blank into a tube by simply rolling the sheet or blank in a straight roll. A tire thus constructed will possess all of the advantages inherent in the preferred form of curling or rolling, except that suitable means must be provided for securing the ends of the tire together, as in the case when the tire is formed as shown in Fig. 7.

The order of arrangement of the step of treating the fabric to give to its surface the property of adhesion and of joining together the ends of the straight-formed tire is immaterial, as the method relates to the preferred form of the invention.

Having thus fully described my invention, what I claim as new, and desire to secure by Letters Patent, is—

1. A cushion-tire comprising a fabric formed into a convolute, each convolution thereof being spaced from the next adjacent convolution.

2. A cushion-tire comprising a fabric formed into a convolute, each convolution thereof being spaced from the next adjacent convolution, and means for spacing said convolutions each from the others, forming air-chambers.

3. A cushion-tire comprising a fabric formed into a convolute, each convolution thereof being spaced from the next adjacent convolution, each convolution being formed with spacing means, whereby air-chambers are formed between the convolutions.

4. A cushion-tire comprising a fabric formed into a convolute, each convolution thereof being spaced from the next adjacent convolution, and means for spacing apart said convolutions to form air-chambers, said spacing means being positively secured to each of the layers spaced thereby.

5. In the construction of cushion-tires, a sheet or blank of rubber having one of its surfaces provided or formed with raised supports, whereby when said sheet or blank is curled or rolled the convolutions will be separately supported by said supports.

6. A cushion-tire, composed of a series of convolutions separated by raised supports, said convolutions extending the length of the tire.

7. A cushion-tire, constructed from a sheet or blank of rubber having one of its surfaces provided or formed with raised supports, said sheet or blank curled or rolled into convolute form, whereby each convolution will be separated from the next adjacent one and supported by said raised supports.

8. A cushion-tire, constructed from a sheet or blank of rubber having one of its surfaces provided or formed with raised supports, said sheet or blank curled or rolled into convolute form, whereby each convolution will be separated from the next adjacent one and supported by said raised supports, and a covering for said convolute form.

9. A cushion-tire constructed from a sheet or blank of rubber having one of its surfaces provided or formed with raised supports, united or intersecting each other, said sheet or blank curled or rolled into convolute form, whereby each convolution will be separately supported by said raised supports.

10. A cushion-tire constructed from a sheet or blank of rubber having one of its surfaces provided or formed with raised supports, united or intersecting each other, said sheet or blank curled or rolled into convolute form, whereby each convolution is separately supported by said raised supports, and a covering for said convolute form.

11. A cushion-tire constructed from a sheet or blank of rubber having one of its surfaces provided or formed with raised supports, said sheet or blank curled or rolled into convolute form, whereby each convolution is separately supported by said raised supports and a covering integral with the sheet or blank.

12. A cushion-tire constructed from a sheet or blank of rubber having one of its surfaces provided or formed with raised supports, united or intersecting each other, said sheet or blank curled or rolled into convolute form, whereby each convolution is separately supported by said raised supports, and a covering integral with the sheet or blank.

13. A cushion-tire, constructed from a sheet or blank of rubber having one side provided with raised supports and the other with a backing of canvas, said sheet or blank curled or rolled into convolute form, whereby each convolution will be separated from the next adjacent one, and supported by said raised supports.

14. A cushion-tire, constructed from a sheet or blank of rubber having one side provided with raised supports and the other with a backing of canvas, said sheet or blank formed into a cylinder and then curled or rolled into a convolute, and a covering integral with said sheet or blank.

15. The method of forming a cushion-tire comprising the following steps: first, giving to the fabric the form of a cylinder; second, convolving the cylinder, and, third, spacing the convolutions of the convolute.

16. The method of forming a cushion-tire comprising the following steps: first, giving to the fabric the form of a cylinder; second, convolving the cylinder; third, spacing the convolutions of the cylinder, and, fourth, treating the surface of the convolute that the spacing means may adhere to the surface of the convolutions.

17. The method of forming a cushion-tire comprising the following steps: first, cutting from the fabric a blank of the required size and form; second, forming the blank into a cylinder; third, convolving the cylinder, and, fourth, spacing the convolutions.

18. The method of forming a cushion-tire comprising the following steps: first, cutting from the fabric a blank of the required size and form; second, forming the blank into a cylinder; third, convolving the cylinder; fourth, spacing the convolutions, and, fifth, treating the surface of the convolute that the spacing means may adhere to the surface of the convolutions.

19. The method of making a cushion-tire from a fabric provided with raised surfaces, as spacing means, comprising the following steps: first, forming the fabric into a cylinder, and, second, convolving the cylinder.

20. The method of making a cushion-tire from a fabric provided with raised surfaces as spacing means, comprising the following steps: first, forming the fabric into a cylinder; second, convolving the cylinder, and, third, treating the surface of the convolute that the spacing means may adhere to the surface of the convolutions.

In testimony whereof I affix my signature in the presence of two witnesses.

WEBBER G. KENDALL.

Witnesses:
F. T. F. JOHNSON,
J. R. NOTTINGHAM.